Patented Mar. 18, 1941

2,235,067

UNITED STATES PATENT OFFICE 2,235,067

LIQUID AMMONIUM ACETATE

Alexander M. Georgiev, Dayton, Ohio, assignor to General Motors Corporation, Detroit, Mich., a corporation of Delaware No Drawing. Application November 12, 1938, Serial No. 240,205

14 Claims. (Cl. 260—541)

This invention relates to the art of handling ammonium acetate, and has for an object to transform that compound from a solid or crystalline character to one of substantially permanent liquid form.

A further object of the invention is to process crystalline ammonium acetate, so that it will remain of liquid character indefinitely, though cooled far below its recognized melting point.

Further objects and advantages of the present invention will be apparent from the following description, wherein a preferred embodiment of the present invention is clearly disclosed.

The foregoing objects are accomplished by heating the normally crystalline compound in a closed vessel to a temperature well above the melting point of the compound, and then gradually and slowly cooling the compound in the closed vessel to room temperature.

One of the component parts of an electrolyte for electrolytic condensers, and the like, and for the impregnation of spacers and condenser sections for electrolytic devices, is ammonium acetate. That compound as put out by chemical supply houses is in crystalline form. It is hygroscopic, and readily becomes somewhat plastic and lumpy. It melts at about 237° F., and readily decomposes when exposed in an open vessel. Due to the fact that ammonium acetate is extremely hygroscopic, special precautions must be observed to prevent moisture from being absorbed by it in the course of filling, transporting and storing of containers with ammonium acetate. Furthermore, the filling of the jars or barrels and their emptying is a rather slow operation because of the formation of lumps by the crystallized ammonium acetate. On the other hand, the filling and emptying must be done promptly to avoid contamination with moisture from the atmosphere.

I have made the observation that if ammonium acetate is heated in a substantially closed vessel to about 250° or 300° F. it becomes a clear liquid, but upon cooling it ordinarily recrystallizes. However, if chilling is avoided and cooling takes place very slowly, and gradually in a closed vessel, the ammonium acetate remains indefinitely a clear liquid at room temperature.

Ammonium acetate so liquefied, has been subjected to severe tests for recrystallization and many attempts have been made to recrystallize the compound. The compound in the liquid form has been found to retain the new properties effected by the above defined treatment even under extreme conditions. Samples of the transformed compound have been cooled and maintained at a temperature of about 32° F. for a period of days, without the compound reverting to the crystalline form, even when shaken in the presence of added dry crystals of the same compound. Samples of the compound so processed have been shipped 600 to 700 miles, and shown no signs of recrystallization. The samples after shipment remain liquid in form indefinitely. I have not found the liquid form of the compound to exhibit any different chemical characteristics than the crystalline form of the compound. The liquefied form appears to retain all of the component parts of the crystalline form, and in exactly the same proportions.

Such liquefaction of ammonium acetate is of practical value because it facilitates the filling and emptying of the containers, permits the use of simpler and less expensive containers, and minimizes the danger of contamination with atmospheric moisture while the filling or emptying is taking place. In addition to that, a greater quantity by weight can be put in a given container when the compound is liquefied.

When the ammonium acetate is to be admixed or dissolved in some liquid, like glycerine for instance, it is much easier to carry this out if the ammonium acetate is in a liquid state. While dissolving of crystallized ammonium acetate usually calls for heating, the liquid ammonium acetate can be simply stirred with the glycerine or with other liquid substances at room temperature.

Specifically, in practicing this invention, I place a charge of the compound in the crystalline form in a vessel, which I close up and substantially hermetically seal, to the extent of preventing any ingress of air and moisture, or egress of the constituents of the compound while it is being processed. I then heat the vessel so charged with the compound to a temperature near 300° F. and maintain that temperature for sufficient time to insure complete melting or liquefaction of all of the crystals of the compound. The heating may be accomplished by placing the vessel in an oven and bringing it up to temperature, or, if so desired, the vessel may be placed in a hot oven. On the other hand, the vessel may be heated by other methods, as by direct application to the vessel, or by heated bath about the same. In any instance, the heating effects complete liquefaction of the compound, and I desire to continue the heating for an appreciable length of time to insure that. In practice, I maintain the heating for a period of several hours.

After the conclusion of the heating step, I cool the liquefied mass very slowly and gradually and without chilling. I find that where the heating step is carried out in an insulated oven, that removal of heat therefrom permits the liquefied mass to cool properly without chilling within a period of 10 to 15 hours. Any gradual cooling to room temperature, that is to a temperature in the order of 60° to 70° F., over a period of equivalent extent, is satisfactory, so long as chilling is avoided.

The vessel containing the compound is maintained sealed through the entire process so that there is no apparent change in the chemical constitution of the compound during the processing. The resultant product appears not to be a mere supercooled liquid for it does not exhibit the usual properties of such supercooled liquids.

While the embodiment of the present invention as herein disclosed, constitutes a preferred form, it is to be understood that other forms might be adopted, all coming within the scope of the claims which follow.

What is claimed is as follows:

1. The method of rendering ammonium acetate suitable as an ingredient in an electrolyte for electrolytic condensers, comprising the steps in combination, heating in a closed vessel a batch of the compound in the crystalline form to well above the melting point, thence gradually and slowly cooling the liquefied mass in the closed vessel to room temperature.

2. The method of preparing ammonium acetate of the normally crystalline form for use as an electrolyte, comprising the steps in combination, heating the crystalline form of the compound in a closed vessel to about 300° F. and until all of the crystals are melted, and gradually and slowly cooling without chilling the liquefied mass to room temperature.

3. The method of processing ammonium acetate as an ingredient for electrolytes, comprising the steps in combination, melting the crystalline form of the compound in a vessel substantially sealed against ingress and egress of atmospheres and vapors, maintaining the melted compound at a temperature above its recognized melting point for a period of time to insure complete melting of the crystals, and then cooling the melted mass of compound to room temperature without chilling, and while maintaining the vessel sealed.

4. The method of preparing ammonium acetate of the normally crystalline form for use as an electrolyte, comprising the steps in combination, heating a mass of the crystals in a substantially sealed vessel to a temperature in excess of the melting point of the compound, continuing the heating of the mass until a clear homogeneous liquid is effected, and thence slowly cooling the liquid mass to room temperature without chilling, and under initial seal of the vessel.

5. The method of treating commercial ammonium acetate for use as an electrolyte, comprising the steps in combination, heating crystalline ammonium acetate out of contact with atmospheric air, while progressively increasing the pressure thereon, maintaining the temperature sufficiently high to insure melting of all the crystals, and gradually cooling to room temperature the liquefied acetate while concomitantly and progressively decreasing the pressure thereon.

6. The method of treating crystalline ammonium acetate as an electrolyte ingredient, comprising the steps in combination, heating crystalline ammonium acetate out of contact with atmospheric air until it becomes a clear liquid, thence slowly cooling to room temperature out of contact with atmospheric air, and while maintaining the compound in a clear liquid state.

7. The method of preparing stable mobile non-aqueous ammonium acetate, comprising the steps in combination, placing crystals of the compound in a vessel and closing against exposure to atmospheric air, liquefying the crystals by application of heat, and increase of vapor pressure, thence maintaining the liquefaction by concomitantly reducing the heating to room temperature, and decreasing the vapor pressure.

8. A chemical reagent consisting of stable anhydrous liquid ammonium acetate.

9. A chemical reagent consisting of non-aqueous liquid ammonium acetate.

10. A chemical reagent consisting of stable anhydrous liquid ammonium acetate.

11. The method of preparing normally crystalline ammonium acetate as a liquid constituent for electrolytes, comprising the steps in combination, loading a vessel with the compound in the crystalline form, closing the vessel with sufficient seal to prevent any ingress of air or moisture, and to prevent any egress of the constituents of the compound while it is being treated, heating the vessel and its load to a temperature of near 300° F. and until melting of all of the crystals of the compound is effected, thence lowering the temperature of the load gradually and very slowly over a period of several hours to effect cooling of the treated mass to room temperatures without chilling, whereby a permanently liquid product is obtained.

12. The method of preparing normally crystalline ammonium acetate as a liquid electrolyte, comprising the steps in combination, loading a vessel with crystalline compound to be treated, sealing the vessel against fluid flow through the walls thereof while the compound is being treated, heating the sealed vessel and its load to a temperature well above the melting point of the compound, and maintaining the vessel and its load at the elevated temperature until every crystal of the compound is liquefied, thence gradually reducing the temperature so that the vessel and its load slowly returns to room temperature after a period of several hours without chilling, the resultant product being a non-crystalline, but free flowing liquid in character at normal or room temperatures.

13. A process for treating commercial ammonium acetate to provide an electrolyte liquid, comprising the steps in combination, enclosing a charge of the compound in a sealed vessel, and while the vessel is maintained under seal heating the charge to a temperature in the order of 250° to 300° F. for such a period of time that the whole charge becomes a clear liquid, and thence while the vessel is still sealed controlling the cooling of the charge to room temperature slowly and gradually over a period of several hours so that a resultant liquid product at room temperatures is obtained.

14. A process for treating commercial ammonium acetate to provide an electrolyte liquid, comprising the steps in combination, enclosing a charge of the compound in a sealed vessel, and while the vessel is maintained under seal heating the charge to a temperature in the order of 250° to 300° F. for such a period of time that the whole charge becomes a clear liquid, and thence restoring the charge to room temperature by controlling the cooling thereof to effect a slow and continuous loss of heat over a period of several hours before the seal of the vessel is broken, there resulting a mobile liquid product at ordinary temperature.

ALEXANDER M. GEORGIEV.